US00RE35436E

United States Patent [19]

Grilliot et al.

[11] E Patent Number: Re. 35,436

[45] Reissued Date of Patent: Feb. 4, 1997

[54] FIREFIGHTER'S GARMENTS HAVING ENHANCED FLEXIBILITY AND MINIMUM WEIGHT

[75] Inventors: William L. Grilliot; Mary I. Grilliot, both of West Milton, Ohio

[73] Assignee: Morning Pride Manufacturing, Inc., Dayton, Ohio

[21] Appl. No.: 170,410

[22] Filed: Dec. 20, 1993

Related U.S. Patent Documents

Reissue of:

[64] Patent No.: 4,922,552
Issued: May 8, 1990
Appl. No.: 345,668
Filed: May 1, 1989

U.S. Applications:

[62] Division of Ser. No. 182,398, Apr. 18, 1988, Pat. No. 4,843,646.

[51] Int. Cl.[6] ..... A41D 13/00

[52] U.S. Cl. ..... 2/93; 2/81; 2/79; 2/85; 2/97; 2/227; 2/272

[58] Field of Search ..... 2/69, 79, 81, 85, 2/86, 93, 97, 227, 231, 232, 272, 2, 2.11, 2.14, 2.15, 2.16, 70

[56] References Cited

U.S. PATENT DOCUMENTS

| | | | |
|---|---|---|---|
| 440,988 | 11/1890 | Appel | 2/231 |
| 1,082,214 | 12/1913 | Robinson | 2/81 |
| 2,314,668 | 3/1943 | Lee | 2/94 |
| 2,483,015 | 9/1949 | Levy | 2/97 |
| 3,231,899 | 2/1966 | Seidel | 2/93 |
| 4,509,213 | 4/1985 | Harvey | 2/227 |

FOREIGN PATENT DOCUMENTS

| | | | |
|---|---|---|---|
| 366919 | 1/1939 | Italy | 2/93 |

OTHER PUBLICATIONS

Custom–Deluxe Turnouts, Janesville Apparel, 1986.
Express–Guard TM Turnouts of Nomex III Aramid, Body–Guard, Division of Lion Apparel.
We've been building up to this Project Fires suit for one hundred years. Globe Firefighters Suits.
Globe Manufacturing Catalog of 1980, pp. 2 & 10.

*Primary Examiner*—Diana Biefeld
*Attorney, Agent, or Firm*—Rockey, Rifkin and Ryther

[57] ABSTRACT

A firefighter's garment which includes a layer of protective material in which the layer of protective material is provided with a major portion which has a high degree of thermal protective properties. The layer of protective material also has sections which have a lesser degree of thermal protective properties. The protions of the layer of protective material which have a high degree of thermal protective properties are positioned at locations which require maximum thermal protection. The portions of the layer of protective material which have a lesser degree of thermal protective properties are located at positions which require less thermal protection. The portions of the layer of protective material which have a lesser degree of thermal protective properties also have greater flexibility and less bulk and less weight. Thus, the possibility of stress upon the firefighter is not effectively decreased when firefighter body posture during firefighting and the role of the protective equipment is considered.

10 Claims, 3 Drawing Sheets

FIREFIGHTER'S GARMENTS HAVING ENHANCED FLEXIBILITY AND MINIMUM WEIGHT

Matter enclosed in heavy brackets [ ] appears in the original patent but forms no part of this reissue specification; matter printed in italics indicates the additions made by reissue.

RELATED APPLICATION

This application is a division of application Ser. No. 182,398, filed Apr. 18, 1988, now U.S. Pat. No. 4,843,646.

BACKGROUND OF THE INVENTION

During the fighting of a fire, a firefighter works in a very hostile environment. Many firefighter's lose their lives while fighting fires. Most of the deaths of firefighters while fighting fires result from stress, heart attacks, strokes, and the like. Of course, a firefighter must be protected from the environment within which the firefighter works. However, in an attempt to provide adequate protection, the garments of firefighters have been too heavy, too bulky, while also lacking flexibility.

A firefighter's garment customarily has a plurality of layers of material, including: an outer shell, which is flame resistant and which resists punctures and abrasions, an intermediate layer, which is a moisture barrier, and an inner layer which is a thermal barrier. These layers may be three distinct layers or one or two members.

In the past, the inner liner in a firefighter's garment has been completely one material. The materials available for an inner liner of a firefighter's garment vary considerably. As a rule, the more insulative an inner liner is, the more bulky is the liner. Thus, the more bulky a liner is, the more stress is placed upon the firefighter who wears the garment. Conversely, the less insulative material in the inner liner, the less bulky the inner liner is. However less bulk provides less protection. In the past, fire departments made a choice of liner materials. This choice of a liner material constituted a choice of a liner material for the entire garment. The liner material chosen has been a compromise between the most insulative (the most bulky) material and the least acceptable insulative (the least bulky) material. Thus, the fire department tried to ensure that the firefighter was provided with good insulation. However, the insulation chosen was not the best insulation, because a significant degree of flexibility in the garments was desired.

Some of the portions of a firefighter's garments are interfaced with other protective covering members worn by the firefighter.

Similarly, some of the portions of a firefighter's garment interface with body parts in which flexibility in movement is a particularly critical need, for example back of knees, front of elbows, etc. These "flexing" areas or portions are flexed during firefighting, since firefighters crouch to the floor where the temperature is coolest. The liner portions which are flexed bunch during flexing, and the insulative performance is increased in these areas, as compared to the same material in a single unbunched layer. However, increased insulative performance is not required in these areas or portions, and the bunching of heavy material reduces flexibility. Therefore, such flexing portions or interfaced portions of the garments should properly feature insulation material of the least acceptable weight and least bulkiness. Thus, these areas would have the least acceptable insulation.

In the past, if the least bulky (least insulative) material should be employed in these body areas, the entire garment would contain the least insulative material, since the liners were entirely of one material.

However, most of the portions of a firefighter's garment should have the most insulative (also heaviest, most bulky) material possible. For instance, since a firefighter always frontally approaches the fire in a crouched position, his shoulders, thighs, and back receive a maximum heat load. Those body areas also are not flex areas and do not receive back up protection from another part of the protective envelope. That is these body areas do not receive back up protection from boots, gloves, etc. In the past, if the most insulative (most bulky) material were used in these maximum heat load body areas, the same heavy bulky insulative material would also be used in body areas in which less bulky material was more optimal.

Therefore, the problem solved in this invention is the creation of a firefighter's protective clothing system which addresses each body part's unique liner needs optimally, and without detriment to the different needs of other body parts.

It is an object of this invention to provide firefighter's garments which include maximally insulative, heavier liner materials in areas in which maximum insulative protection is required, such as shoulders, back, thighs, etc. Also, an object of the invention is to provide in the same garments lighter, more flexible (hence comparatively less insulative) liner materials in areas which are flexed and/or which interface with other protective garments.

It is another object of this invention to provide a firefighter's protective clothing system which is minimally stressful, that is lighter in weight and permitting ease of movement, while being adequately protective.

It is another object of this invention to provide a firefighter's protective clothing system in which the non-varying influence of a firefighter's posture during firefighting is recognized. That recognition relates to the fact that certain body parts face the highest heat loads, but some of these body parts are supplementarily protected by body position.

It is another object of this invention to provide a firefighter's garments which are optimized by a recognition of the non-varying protective influence of other members or garments of the protective clothing system.

Other objects and advantages of this invention reside in the construction of parts, the combination thereof, and the method of use, as will become more apparent from the following description.

SUMMARY OF THE INVENTION

This invention pertains to a firefighter's coat and trousers. Several portions of a firefighter's coat require flexibility. Such portions are, for example: the elbow areas of the sleeves and the portions of the coat at which the sleeves join the body portion of the coat. Also, several portions of the trousers require flexibility. These portions are the knee regions and the upper leg regions.

In this invention the thickness and bulkiness of the inner liner are reduced in the portions of the garments in which flexibility is required. Thus, greater flexibility in these areas is permitted. However, the necessary degree of thermal protection in these areas is also provided. Thus, even though flexibility is enhanced, and the weight of the garments is reduced, the degree of protection of the firefighter against the environment is not effectively decreased. Therefore, stress resulting from the weight of the garment is reduced. Increased flexibility in regions of the garments in which bending occurs also reduces stress resulting from arm and leg movements of the firefighter.

In this invention, most of the areas of the firefighter's garments in which increased flexibility is provided are areas that are constantly flexed during firefighting. For example, firefighters crouch to escape heat. This causes material bunching and increased insulation. Thus, even if a lesser degree of single layer thermal protection is provided in these areas in which bunching occurs, the firefighter has adequate thermal protection, while also having greater flexibility in the areas in which flexing occurs.

Also, portions of a firefighter's garments which are covered by parts of other wearing apparel of the firefighter require less insulation. In the garments of this invention certain portions of the garments are provided with less protective material because other wearing apparel of the firefighter cover these certain portions. Thus, weight and bulkiness of the garments are reduced without reducing the total protection necessary for the firefighter. As stated above, reduction of bulkiness and weight reduces stress upon the firefighter.

DETAILED DESCRIPTION OF THE INVENTION

Figure 1:
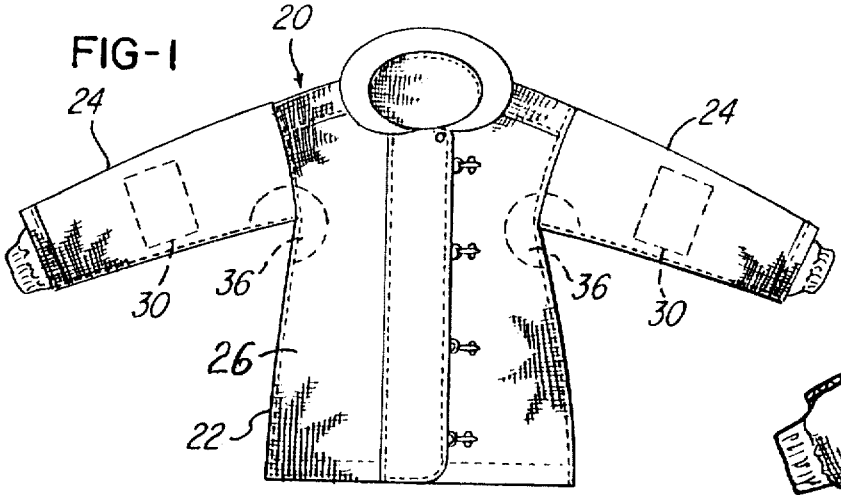
FIG. 1 is a front elevational view of a firefighter's coat of this invention, illustrating regions or areas of the coat in which enhanced flexibility is provided.
Figure 3:
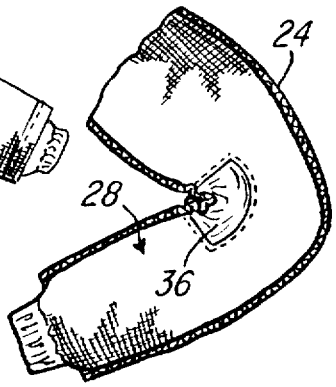
FIG. 3 is a fragmentary sectional view of a portion of the sleeve of the firefighter's coat of FIG. 1, drawn on a larger scale than FIG. 1, and illustrating a portion of the inner liner which is provided with enhanced flexibility.
Figure 2:
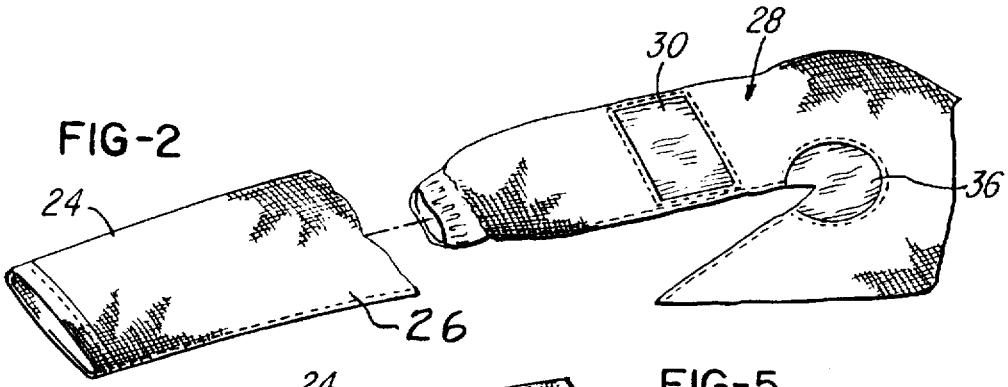
FIG. 2 is a fragmentary exploded perspective view, drawn on a slightly larger scale than FIG. 1, showing a portion of the outer shell of a sleeve of the coat of FIG. 1 and showing a portion of the inner liner and showing portions of the inner liner which have enhanced flexibility.

FIG. 1 shows a firefighter's coat or jacket 20 made according to this invention. The coat 20 has a body portion 22 and sleeve portions 24. The body portion 22 and the sleeve portions 24 of the coat 20 have an outer shell 26 and an inner liner 28. The major part of the inner liner 28 is constructed of a relatively bulky thermal insulation material. However, as illustrated in FIGS. 2 and 3, the inner liner 28 of each sleeve portion 24 has a section 30 of thermal insulation material which is less bulky and which is readily flexible. The section 30 is in the elbow region of the inner liner 28 and thus provides enhanced flexibility in the elbow region of the sleeve portion 24 of the coat 20, for bending of the elbow, as illustrated in FIG. 3.

Figure 4:
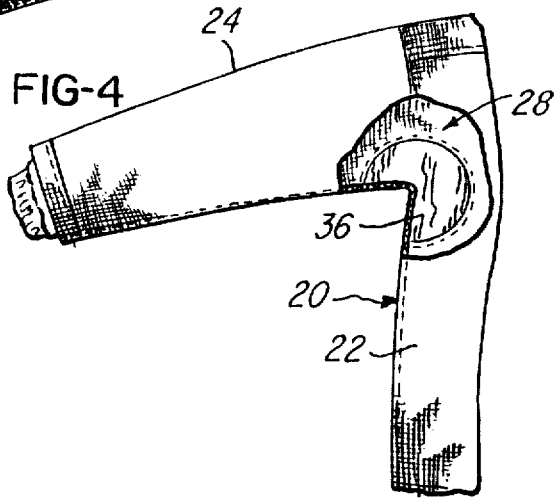
FIG. 4 is a fragmentary elevational view, with parts broken away, showing the sleeve and a part of the underarm portion of the firefighter's coat of this invention which is provided with enhanced flexibility.
Figure 5:
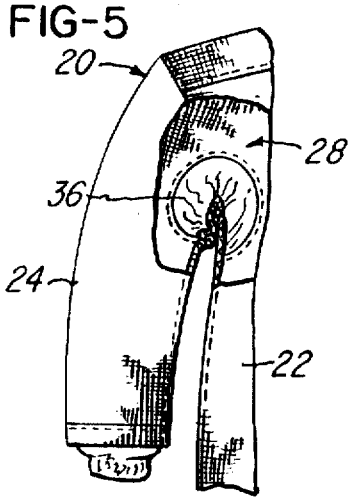
FIG. 5 is a fragmentary elevational view, with parts broken away, drawn on substantially the same scale as FIG. 4, and showing the sleeve and the underarm portion of the coat which has enhanced flexibility. This view shows the sleeve in a position different from that shown in FIG. 4.
Figure 6:
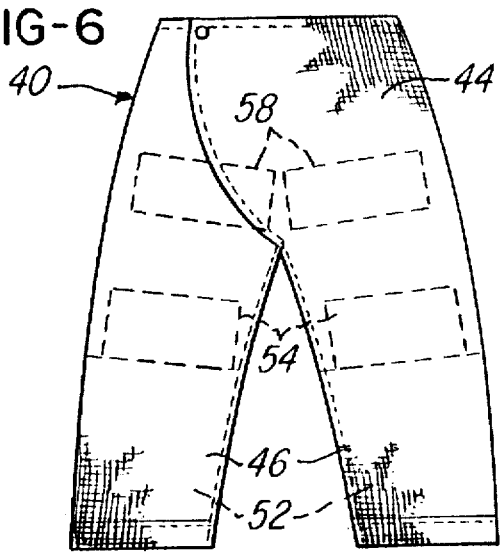
FIG. 6 is a front elevational view of firefighter's trousers constructed in accordance with this invention, illustrating portions of the trousers in which enhanced flexibility is provided.
Figure 7:
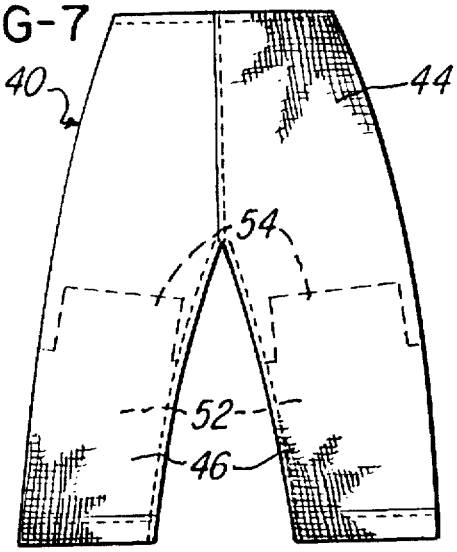
FIG. 7 is a rear elevational view of the trousers of FIG. 6, drawn on substantially the same scale as FIG. 6, illustrating the portions of the trousers which are provided with enhanced flexibility.

FIG. 2 shows the inner liner 28 removed from the outer shell 26. The inner liner 28, in addition to having the section 30, also has a section 36 which is located at the juncture of each sleeve 24 and the body 22. The section 36 is also of insulation material which is less bulky and of lighter weight than other portions of the inner liner 28. Thus, this juncture has enhanced flexibility for movement of the firefighter's arm, with respect to the body 22 of the coat 20, as illustrated in FIG. 4 and 5.

Thus, it is understood that the sections 30 and 36 which are a part of the inner liner 28 are of thermal insulation material, but are of an insulation material which is less bulky and of less weight that other portions of the inner liner 28. The sections 30 and 36 may be of a thermal insulation material which has lesser thermal insulation qualities than the other portions of the inner liner 28. However, the sections 30 and 36 provide sufficient thermal insulation in these regions of the coat 20, due to the fact that the sections 30 and 36 are in parts of the coat 20 which do not directly face flames of a fire and in which lesser thermal insulation is required.

Thus, the coat 20 provides excellent insulation and protection for a firefighter, while also providing a firefighter with a coat 20 having enhanced flexibility in the regions in which flexibility is desired. Furthermore, the coat 20, having the sections 30 and 36, which are of less bulky insulation material, has less weight than a conventional coat for a firefighter. Thus, the wearer of the coat 20 is subjected to less stress from arm movement and less stress from weight of the coat 20.

Figure 8:
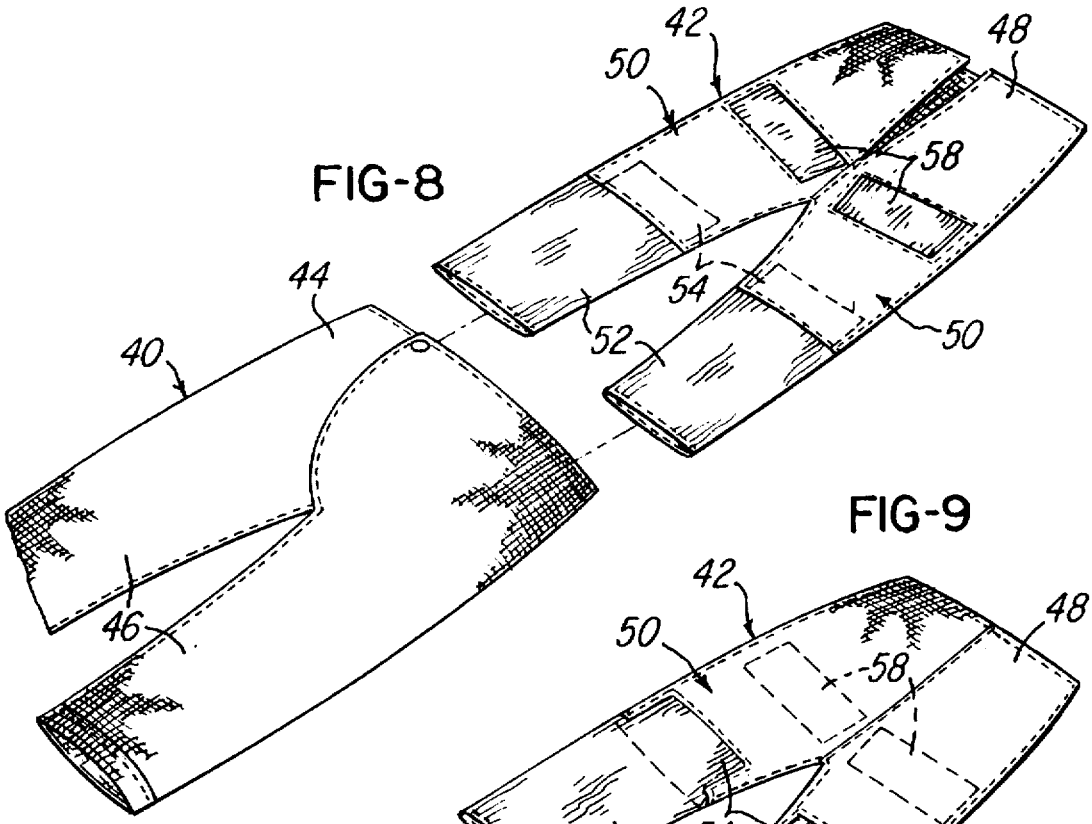
FIG. 8 is a front perspective exploded view, illustrating the inner liner removed from the outer liner of the trousers and showing the portions of the inner liner which are provided with enhanced flexibility.
Figure 9:
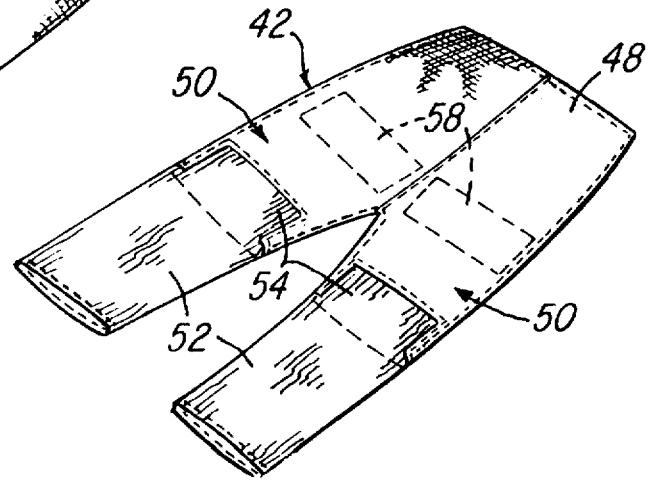
FIG. 9 is a rear perspective rear view of the inner liner of the trousers, illustrating the areas of the inner liner which are provided with enhanced flexibility.

FIGS. 6–12 pertain to a firefighter's trousers which are made according to this invention. The firefighter's trousers have an outer shell 40 and an inner liner 42. The outer shell 40 has a torso portion 44 and leg portions 46. The inner liner 42 has a torso portion 48 and leg portions 50. FIG. 8 shows the inner liner 42 removed from the outer shell 40. As best shown in FIG. 8, the inner liner 42 has sections 52 at the lower part of the leg portions 50. Above the section 52 the inner liner 42 has sections 54 at the back of the knee region of the leg portions 50. The inner liner 42 also has sections 58 at the front part thereof adjacent the juncture of the leg portions 50 and the torso portions 48. The sections 52, 54, and 58 of the inner liner 42 are of insulation material but are of an insulation material which is lighter in weight and which is less bulky and which has greater flexibility than the other portions of the inner liner 42. All of the sections 52, 54, and 58 may have the same physical characteristics or may have different physical characteristics.

Thus, the trousers have enhanced flexibility and enable easy bending movement in the knees of the leg portions 46 and 50 and easy movement of the leg portions 50 with respect to the torso portions 44 and 48. The sections 52, 54, and 58, in addition to being more flexible than other portions of the inner liner 42 are of less weight per unit of area than other portions of the inner liner 42. Therefore, the trousers are of less weight. Thus, the wearer of the firefighter's trousers is subjected to a lesser degree of stress than the wearer of conventional firefighter's trousers. The lesser degree of stress results from enhanced flexibility for arm and leg movements, and also results from the fact that the garments have minimum weight. These advantages are provided without decreasing the total protection provided for the firefighter.

Figure 10:
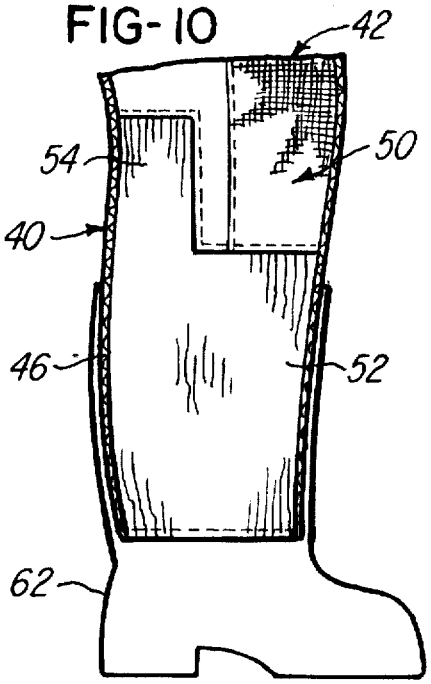
FIG. 10 is a fragmentary sectional view, drawn on a larger scale than the other figures, showing the lower part of a leg portion of the trousers as the lower part is positioned within a boot.
Figure 11:
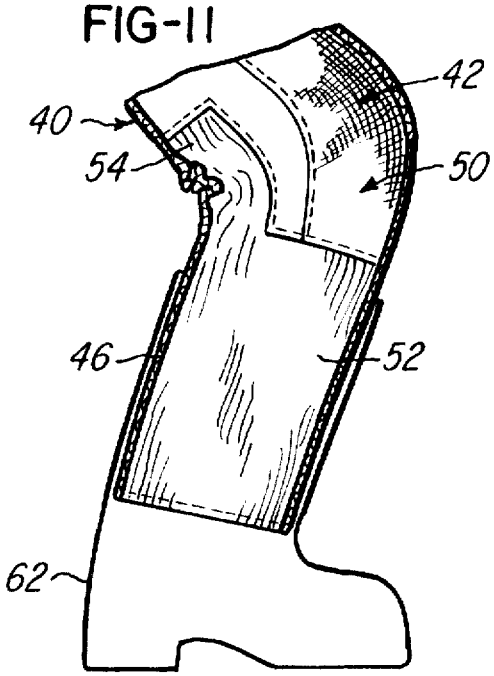
FIG. 11 is a fragmentary sectional view drawn substantially on the same scale as FIG. 10 and illustrating the leg portion of the trousers in a bent condition.
Figure 12:
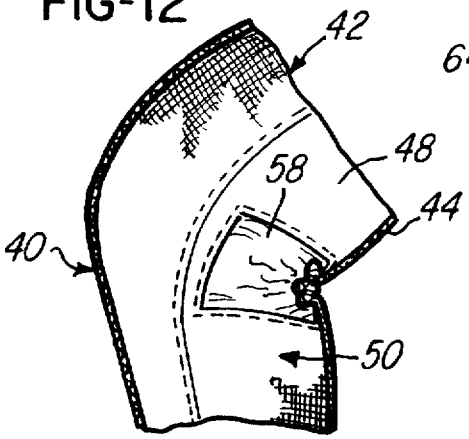
FIG. 12 is a fragmentary sectional view drawn on substantially the same scale as FIGS. 10 and 11, showing a part of the torso and leg portions of the trousers, with the torso portion and leg portions in a bent condition.

FIGS. 10 and 11

Customarily a firefighter wears boots. The lower parts of the legs of the firefighter's trousers are covered by the boots. Therefore, the parts of the legs of the trousers which are covered by the boots do not need to be of heavy insulation material. This is illustrated in FIGS. 10 and 11 in which a boot 62 is shown covering the section 52. Therefore, even though the section 52 has a lesser degree of insulation, the legs of the firefighter are properly protected. Also, due to the fact that the sections 52 of the leg portions 46 of the inner liner 42 are relatively flexible and of relatively light weight, the leg portions 46 and 50 are easily inserted into the boot 62.

FIGS. 13–15

Figure 13:
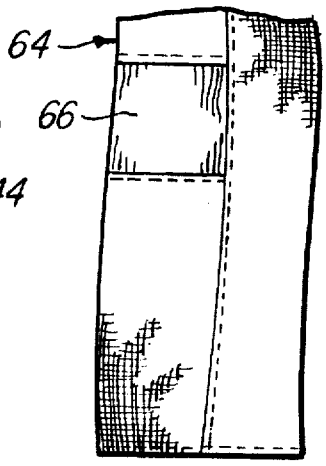
FIG. 13 is a fragmentary elevational view, drawn on substantially the same scale as FIGS. 10 and 11, showing a modification in an inner liner of the leg portion of the trousers.

FIG. 13 shows a modification of trouser inner liner construction. In FIG. 13, the major portion of an inner liner 64 is of a relatively heavy thermal insulation material. However, at the back part of the knee region the inner liner 64 has a section 66 which is of lighter weight, less bulky, thermal insulation material and which has greater flexibility.

Figure 14:
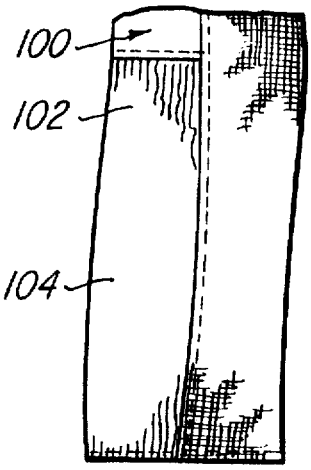
FIG. 14 is a fragmentary elevational view showing another modification in the inner liner of the leg portion in firefighter's trousers of this invention.

FIG. 14 shows a trouser leg inner liner 100 which has a knee section 102 and a lower leg section 104, both of which are of lighter weight insulation material than the major portions of the liner 100. The knee section 102 and the lower leg portion 104 have enhanced flexibility while providing adequate thermal protection. The knee section 102 and the lower leg section 104 may be of the same material or of different materials.

Figure 15:
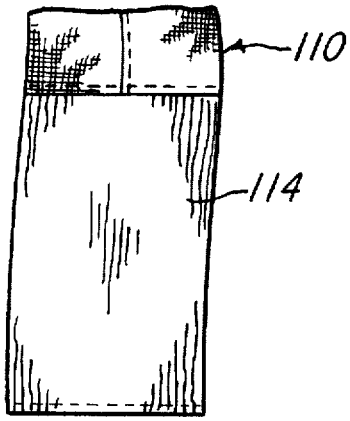
FIG. 15 is a fragmentary elevational view showing another modification of the inner liner in the leg portion of firefighter's trousers of this invention.

FIG. 15 shows a trouser leg inner liner 110 which includes a lower section 114 which is tubular and which covers both the knee area and the lower leg area of a firefighter. The section 114 is of a thermal insulation material which is different from the insulation material in the major portions of the inner liner 110.

Thus, it is understood that this invention provides firefighter's garments which have proper and adequate insulation, while also providing firefighter's garments which are lighter in weight and which are readily flexible in regions in which flexibility is desired. Thus, this invention provides firefighter's garments in which the possibility of stress is greatly reduced, while proper protection of the firefighter is provided.

Although the preferred embodiments of the firefighter's garments having enhanced flexibility and minimum weight of this invention have been described, it will be understood that within the purview of this invention various changes may be made in the form, nature, details, proportion and arrangement of parts, the combination thereof, the construction of parts, and the mode of use, which generally state consist in a structure or method within the scope of the appended claims.

The invention having thus been described, the following is claimed:

[1. A firefighter's garment for protection of a firefighter during fire fighting activity and to create minimum stress within the firefighter during firefighting activity, the firefighter's garment comprising an outer shell of flexible abrasion resistant and flame resistant material, a layer of flexible high temperature thermal insulation material enclosed by the outer shell, the layer of flexible high temperature insulation material including a first portion which is relatively bulky and which has limited flexibility, the first portion of the layer of flexible high temperature thermal insulation material having given thermal insulation qualities, the layer of flexible high temperature thermal insulation material also including a second portion of flexible high temperature thermal insulation material, the second portion of flexible high temperature insulation material being less bulky in character and having greater flexibility than the first portion of the layer flexible high temperature thermal insulation material, the second portion of the layer of flexible high temperature thermal insulation material having lesser thermal insulation qualities than the first portion of the layer of flexible high temperature thermal insulation material.]

[2. The firefighter's garment of claim 1 in which the layer of flexible high temperature thermal insulation material has a minor part which is subject to extreme bending, and in which the second portion of the layer of flexible high temperature thermal insulation material is within the minor part of the layer of flexible high temperature thermal insulation material.]

[3. The firefighter's garment of claim 1 in which the garment comprises a firefighter's coat provided with a sleeve having an elbow region, the second portion of the layer of flexible high temperature thermal insulation material being within the elbow region of the sleeve of the coat.]

[4. The firefighter's garment of claim 1 in which the garment comprises a firefighter's coat having a body region and a sleeve, the coat having a juncture region in which the sleeve is joined to the body region, and in which the second portion of the layer of flexible high temperature thermal insulation material is adjacent the juncture region of the coat.]

[5. The firefighter's garment of claim 1 which comprises trousers having a pair of leg sections, each of the leg sections having a knee area, and in which the second portion of the layer of flexible high temperature thermal insulation material is within each knee area.]

[6. The firefighter's garment of claim 1 which comprises trousers having a torso part and a pair of leg parts, there being juncture regions at which the leg parts are joined to the torso part, and in which the second portion of the layer of flexible high temperature thermal insulation material is within the juncture region.]

[7. The firefighter's garment of claim 1 which comprises trousers having a torso part and a pair of leg parts, there being a plurality of juncture regions at which the leg parts are joined to the torso part, and in which the second portion of the layer of flexible high temperature thermal insulation material is within the juncture regions, each of the leg parts also having a knee region, and in which the second portion of the layer of flexible high temperature thermal insulation material is also within the knee region of each of the leg parts.]

[8. A firefighter's garment which comprises a layer of insulation material in which the layer includes a first portion which is relatively bulky and which has limited flexibility, the layer of insulation material also including a second portion of insulation material, the second portion of insulation material being less bulky in character and having greater flexibility than the first portion of the layer of insulation material, the firefighter's garment being adapted to be worn by a firefighter who wears another element of firefighting apparel, the layer of insulation material having a part which is covered by another element of firefighting apparel, and in which the second portion of the layer of insulation material is covered by a part of the other element of firefighting apparel.]

[9. A firefighter's garment which comprises a layer of insulation material in which the layer includes a first portion which is relatively bulky and which has limited flexibility, the layer of insulation material also including a second portion of insulation material, the second portion of insulation material being less bulky in character and having greater flexibility than the first portion of the layer of insulation material, the garment being adapted for wear by a firefighter who also wears a pair of boots, and in which the garment comprises trousers having lower leg regions which are covered by the boots which are worn by the firefighter, and in which the second portion of the layer of insulation material is within the lower leg regions of the trousers.]

10. A firefighter's garment which comprises a layer of insulation material in which the layer includes a first portion which is relatively bulky and which has limited flexibility, the layer of insulation material also including a second portion of insulation material, the second portion of insulation material being less bulky in character and having greater flexibility than the first portion of the layer of insulation material, the layer of insulation material including a third portion, the third portion being of an insulation material which is less bulky and more flexible than the first portion of the layer of insulation material and in which the third portion has bulk and flexibility characteristics different from the bulk and flexibility characteristics of the second portion of the layer of insulation material.

[11. A firefighter's garment which comprises a layer of thermal insulation material in which the layer of thermal insulation material includes a first portion which is relatively bulky and which has limited flexibility, the layer of thermal insulation material also including a second portion of thermal insulation material, the second portion of thermal insulation material being less bulky in character and having greater flexibility than the first portion of the layer of thermal insulation material, and a layer of abrasion resistant material covering the layer of thermal insulation material, the garment being worn by a firefighter who wears another element of firefighting apparel, the layer of thermal insulation material having a part which is covered by the other element of firefighting apparel, and in which the second portion of the layer of thermal insulation material is covered by a part of the other element of firefighting apparel.]

12. A firefighter's garment which comprises a layer of thermal insulation material in which the layer of thermal insulation material includes a first portion which is relatively bulky and which has limited flexibility, the layer of thermal insulation material also including a second portion of thermal insulation material, the second portion of thermal insulation material being less bulky in character and having greater flexibility than the first portion of the layer of thermal insulation material, and a layer of abrasion resistant material covering the layer of thermal insulation material, the garment comprising a firefighter's coat provided with a sleeve having an elbow region, the second portion of the layer of thermal insulation material being within the elbow region of the sleeve of the firefighter's coat.

[13. A firefighter's garment which comprises a layer of thermal insulation material in which the layer of thermal insulation material includes a first portion which is relatively bulky and which has limited flexibility, the layer of thermal insulation material also including a second portion of thermal insulation material, the second portion of thermal insulation material being less bulky in character and having greater flexibility than the first portion of the layer of thermal insulation material, and a layer of abrasion resistant material covering the layer of thermal insulation material, the garment comprising a firefighter's coat having a body region and a sleeve, the firefighter's coat having a juncture region in which the sleeve is joined to the body region, and in which the second portion of the layer of thermal insulation material is within the juncture region of the firefighter's coat.]

14. A firefighter's garment which comprises a layer of thermal insulation material in which the layer of thermal insulation material includes a first portion which is relatively bulky and which has limited flexibility, the layer of thermal insulation material also including a second portion of thermal insulation material, the second portion of thermal insulation material being less bulky in character and having greater flexibility than the first portion of the layer of thermal insulation material, and a layer of abrasion resistant material covering the layer of thermal insulation material, the firefighter's garment comprising trousers having a pair of leg sections, each of the leg sections having a knee area, and in which the second portion of the layer of thermal insulation material is within each knee area.

[15. A firefighter's garment which comprises a layer of thermal insulation material in which the layer of thermal insulation material includes a first portion which is relatively bulky and which has limited flexibility, the layer of thermal insulation material also including a second portion of thermal insulation material, the second portion of thermal insulation material being less bulky in character and having greater flexibility than the first portion of the layer of thermal insulation material, and a layer of abrasion resistant material covering the layer of thermal insulation material, the firefighter's garment comprising trousers having a torso part and a pair of leg parts; there being juncture regions at which the leg parts are joined to the torso part, and in which the second portion of the layer of thermal insulation material is within the juncture region.]

16. A firefighter's garment which comprises a layer of thermal insulation material in which the layer of thermal insulation material includes a first portion which is relatively bulky and which has limited flexibility, the layer of thermal insulation material also including a second portion of thermal insulation material, the second portion of thermal insulation material being less bulky in character and having greater flexibility than the first portion of the layer of thermal insulation material, and a layer of abrasion resistant material covering the layer of thermal insulation material, the garment being adapted to be worn by a firefighter who also wears a pair of boots, and in which the garment comprises trousers having lower leg regions which are covered by the boots which are worn by a firefighter, and in which the second portion of the layer of thermal insulation material is within the lower leg regions of the firefighter's trousers.

17. A firefighter's garment which comprises a layer of thermal insulation material in which the layer of thermal insulation material includes a first portion which is relatively bulky and which has limited flexibility, the layer of thermal insulation material also including a second portion of thermal insulation material, the second portion of thermal insulation material being less bulky in character and having greater flexibility than the first portion of the layer of thermal insulation material, and a layer of abrasion resistant material covering the layer of thermal insulation material, the firefighter's garment comprising trousers having a torso part and a pair of leg parts, there being a plurality of juncture regions at which the leg parts are joined to the torso part, and in which the second portion of the layer of thermal insulation material is within the juncture regions, each of the leg parts also having a knee region, and in which the second portion of the layer of thermal insulation material is also within the knee region of each of the leg parts.

18. A firefighter's garment which comprises a layer of thermal insulation material in which the layer of thermal insulation material includes a first portion which is relatively bulky and which has limited flexibility, the layer of thermal insulation material also including a second portion of thermal insulation material, the second portion of thermal insulation material being less bulky in character and having greater flexibility than the first portion of the layer of thermal insulation material, and a layer of abrasion resistant material covering the layer of thermal insulation material, the layer of thermal insulation material including a third portion, the third portion of the layer of thermal insulation material being of a thermal insulation material which is less bulky and more flexible than the first portion of the layer of thermal insulation material and in which the third portion of the layer of thermal insulation material has bulk and flexibility characteristics different from the bulk and flexibility characteristics of the second portion of the layer of thermal insulation material.

[19. The method of producing a firefighter's garment for protection of a firefighter while the firefighter is engaged in fire fighting activity comprising providing a layer of flexible high temperature thermal insulation material in which the layer of flexible high temperature thermal insulation material is relatively bulky and limited in flexibility, inserting sections of flexible high temperature thermal insulation material into the layer of flexible high temperature thermal insulation material in which the sections are less bulky and have greater flexibility than the layer of flexible high temperature thermal insulation material, forming the layer of flexible high temperature thermal insulation material including the sections of flexible high temperature thermal insulation material into the form of a garment, whereby the garment has portions of flexible high temperature thermal insulation material which are relatively bulky and of limited flexibility and whereby the garment has sections of flexible high temperature thermal insulation material which are less bulky and which have greater flexibility than said portions of flexible high temperature thermal insulation material, and covering the garment with a layer of flexible abrasion resistant and high temperature flame resistant material.]

*20. A firefighter's coat for protection of a firefighter during firefighting activity and to create minimum stress within the firefighter during firefighting activity, the firefighter's coat having sleeves and an elbow region and comprising an outer shell of flexible abrasion resistant and flame resistant material, a layer of flexible high temperature thermal insulation material enclosed by the outer shell, the layer of flexible high temperature insulation material including a major portion which is relatively bulky and which has limited flexibility, the major portion of the layer of flexible high temperature thermal insulation material having given thermal insulation qualities, the layer of flexible high temperature thermal insulation material also including a minor portion of flexible high temperature thermal insulation material, the minor portion of flexible high temperature insulation material being within the elbow region and being less bulky in character and having greater flexibility than the major portion of the layer of flexible high temperature thermal insulation material, the minor portion of the layer of flexible high temperature thermal insulation material having lesser thermal insulation qualities than the major portion of the layer of flexible high temperature thermal insulation material.*

*21. A firefighter's coat as defined in claim 20 in which the coat includes a body region to which the sleeves are joined and having a sleeve juncture region in which the sleeves are joined to the body region, and the minor portion of the layer of flexible high temperature thermal insulation material is affixed to the sleeve juncture region.*

*22. A firefighter's trousers for protection of a firefighter during firefighting activity and to create minimum stress within the firefighter during firefighting activity, the firefighter's trousers having a pair of leg parts, said leg parts having a knee area and comprising an outer shell of flexible abrasion resistant and flame resistant material, a layer of flexible high temperature thermal insulation material enclosed by the outer shell, the layer of flexible high temperature insulation material including a major portion which is relatively bulky and which has limited flexibility, the major portion of the layer of flexible high temperature thermal insulation material having given thermal insulation qualities, the layer of flexible high temperature thermal insulation material also including a minor portion of flexible high temperature thermal insulation material, the minor portion of flexible high temperature insulation material being within the knee area and being less bulky in character and having greater flexibility than the major portion of the layer of flexible high temperature thermal insulation material, the minor portion of the layer of flexible high temperature thermal insulation material having lesser thermal insulation qualities than the major portion of the layer of flexible high temperature thermal insulation material.*

*23. A firefighter's trousers as defined in claim 22 wherein the trousers having a torso part and a pair of legs parts, there being a leg juncture region in which the leg parts are joined to the torso part and in which the minor portion of the layer of flexible high temperature thermal insulation material is within the leg juncture region.*

* * * * *